(12) United States Patent
Chang

(10) Patent No.: US 7,545,590 B2
(45) Date of Patent: Jun. 9, 2009

(54) OPTICAL LENS MODULE

(75) Inventor: Wei-Chung Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/853,679

(22) Filed: Sep. 11, 2007

(65) Prior Publication Data

US 2008/0192366 A1 Aug. 14, 2008

(30) Foreign Application Priority Data

Feb. 8, 2007 (CN) .................. 2007 1 0200171

(51) Int. Cl.
*G02B 7/02* (2006.01)
(52) U.S. Cl. .................................................. 359/826
(58) Field of Classification Search ......... 359/694–703, 359/820–822, 826, 811–819
See application file for complete search history.

(56) References Cited

U.S. PATENT DOCUMENTS

| 6,556,363 | B2 | 4/2003 | Chiu | |
|---|---|---|---|---|
| 2003/0234986 | A1* | 12/2003 | Takagi et al. | 359/700 |
| 2006/0262429 | A1* | 11/2006 | Manine | 359/822 |

* cited by examiner

*Primary Examiner*—Ricky L Mack
*Assistant Examiner*—Vipin M Patel
(74) *Attorney, Agent, or Firm*—Frank R. Niranjan

(57) ABSTRACT

An optical lens module includes a lens barrel and a barrel base. The lens barrel includes an external wall. The barrel base has a receiving housing for receiving the lens barrel therein. The receiving housing includes an internal wall. The lens barrel defines at least a first positioning block or at least a second positioning slot at the external wall along a longitudinal axis of the lens barrel. The receiving housing defines at least a first positioning slot corresponding to the first positioning block or at least a second positioning block corresponding to the first positioning slot at the internal wall of the receiving housing.

17 Claims, 4 Drawing Sheets

OPTICAL LENS MODULE

BACKGROUND OF THE INVENTION

1. Field of the Invention

The present invention relates to optical lens modules and, particularly, to a compact optical lens module.

2. Description of Related Art

With the popularization of electronic products, such as digital cameras, the requirements for the optical lens modules employed therein is increasing. In order to provide high image quality, a development of the optical lens modules has mainly concentrated on the structure and/or configuration of optical lenses.

Conventional optical lens modules used in digital cameras or other optical apparatuses includes a barrel, a lens base, at least a spacer ring, at least a lens group, and a filter. Generally, an external screw thread is formed on an outer wall of the barrel and, correspondingly, an internal screw thread is formed on an inner wall of the lens base. In an assembling process of the optical lens module, the spacer ring, the lens group, and the filter are disposed in the barrel, and the barrel is then connected with the lens base by the screw thread.

Regarding the use of the screw threading, a torsion force that acts on the occlusive screw thread teeth of the barrel and the lens base needs to be controlled and kept in a certain range. If the torsion that acts on the occlusive screw thread teeth is excessively large, the screw thread teeth may eventually wear out. If the torsion that acts on the occlusive screw thread teeth is excessively small, the barrel may, as a result, be too loosely connected with the lens base, thus affecting how the secure the optical elements are within the barrel are and/or the degree of focusing precision that is possible.

Furthermore, regarding the screw thread connection products, the structure of the screw thread teeth and the spaces between adjacent screw thread teeth may require a relatively high manufacturing precision and a relatively complex manufacturing process. Therefore, the screw thread connection configuration used in the optical lens module may obstruct the miniaturization of the electronic product and/or may inhibit the effective mass manufacture thereof.

Therefore, an optical lens module with a simple manner for connecting the barrel and the lens base is desired.

SUMMARY OF THE INVENTION

An optical lens module includes a lens barrel and a barrel base. The lens barrel includes an external wall. The barrel base has a receiving housing configured (i.e., structure and arranged) for receiving the lens barrel therein. The barrel base includes an internal wall. The lens barrel defines at least a first positioning block or at least a second positioning slot located at the external wall and extending parallel to a longitudinal axis of the lens barrel. The receiving housing defines at least a first positioning slot corresponding to the first positioning block or at least a second positioning block corresponding to the first positioning slot at the internal wall of the receiving housing.

Advantages and novel features will become more apparent from the following detailed description when taken in conjunction with the accompanying drawings.

BRIEF DESCRIPTION OF THE DRAWINGS

Many aspects of the present optical lens module can be better understood with reference to the following drawings. The components in the drawings are not necessarily drawn to scale, the emphasis instead being placed upon clearly illustrating the principles of the present optical lens module. Moreover, in the drawings, like reference numerals designate corresponding parts throughout the several views.

DETAILED DESCRIPTION OF THE INVENTION

Reference will now be made to the drawings to describe the embodiments of the present optical lens module, in detail.

Figure 1:
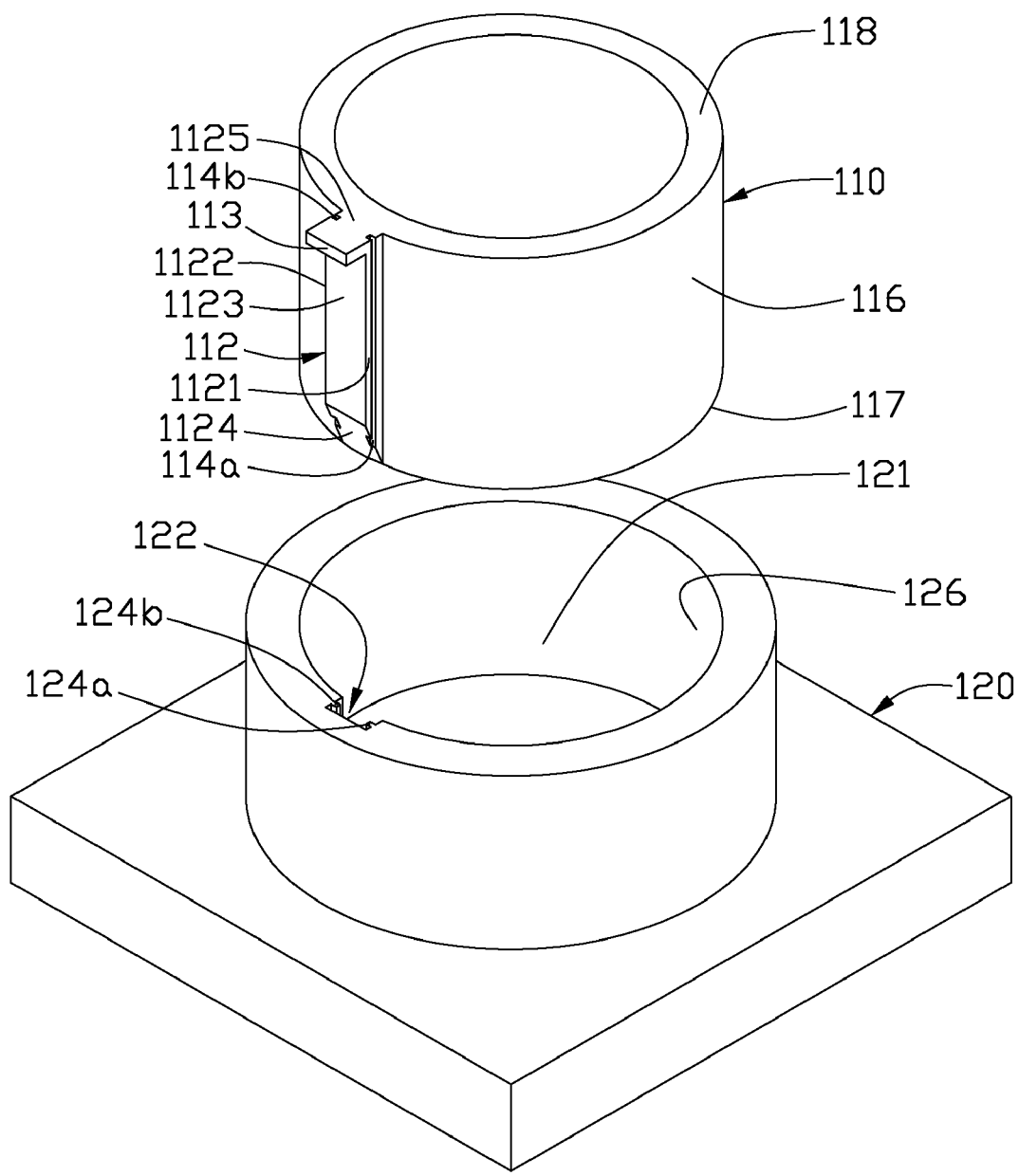
FIG. 1 is an isometric view of optical lens module, in accordance with a first embodiment.

Referring to FIG. 1, an optical lens module 10, in accordance with a first embodiment is illustrated. The optical lens module 10 includes a lens barrel 110 and a barrel base 120. The barrel base 120 defines a receiving housing 121 configured for accepting the lens barrel 110 therein. The receiving housing 121 extends essentially perpendicularly from the main portion (not labeled) of the barrel base 120. The optical lens module 10 may include other optical elements to realize their corresponding optical functions. The lens barrel 110 may, usefully, have a cylinder shape, e.g., a circular cylinder shape. The receiving housing 121 of the barrel base 120 has a cylinder shape corresponding to the lens barrel 110, e.g., a circular cylinder shape. The lens barrel 110 and the receiving housing 121 share a longitudinal axis that concurrent with the optical axis of the optical elements carried within the lens barrel 110.

The lens barrel 110 includes a first end surface 117 and a second end surface 118 at opposite ends thereof, and an external wall 116. The external wall 116 communicates with the first end surface 117 and the second end surface 118. At least one positioning block 112 is formed on the external wall 116. Each such positioning block 112 is configured for facilitating slidable positioning of the lens barrel 110 in the receiving housing 121 of the barrel base 120. The positioning block 112 is engaged with the external wall 116 of the lens barrel 110, either by employing a mechanical connection means (e.g., threaded fastener, adhesive, welding, etc.) or via an integral connection therewith. In the present embodiment, one positioning block 112 is integrally formed with the lens barrel 110 by an injection molding process (i.e., co-molded therewith).

The positioning block 112 includes a first side surface 1121 and a second side surface 1122 at opposite sides thereof, a bottom surface 1124, a top surface 1125, and an external surface 1123 simultaneously adjacent to the above-mentioned four surfaces 1121, 1122, 1124 and 1125. The positioning block 112 may communicate with the first end surface 117 and the second end surface 118 of the lens barrel 110. The top surface 1125 may be coplanar with the second end surface 118 of the lens barrel 110. The first side surface 1121 defines at least a first sliding groove 114a along a lengthwise direction of the lens barrel 110. That is, the first sliding groove 114a is parallel to the longitudinal axis of the lens barrel 110. Correspondingly, the second side surface 1122 defines at least a second sliding groove 114b along the lengthwise direction of the lens barrel 110. Beneficially, the first sliding groove 114a may have a similar structure with the second sliding groove 114b, and a location of the first sliding groove 114a may be symmetrical and, thus, opposed with that of the second sliding groove 114b. The first sliding groove 114a and the second sliding groove 114b may respectively communicate with the bottom surface 1124 and the top surface 1125.

For example, regarding the positioning block 112, the first side surface 1121, the second side surface 1122, the bottom surface 1124, the top surface 1125, and the external surface 1123, all these structures are planar. The external surface 1123 is perpendicularly adjacent to the first side surface 1121, the second side surface 1122, and the top surface 1125. The external surface 1123 intersects the bottom surface 1124 at an obtuse angle. Thus, the positioning block 112 has a wedge-shaped structure, close to the first end surface 117 of the lens barrel 110. Such wedge-shaped structure may facilitate the positioning block 112 to be accurately inserted into the receiving housing 121 of the barrel base 120.

Usefully, a protrusion portion 113 can be formed on the second end surface 118 of the lens barrel 110. The protrusion portion 113 may be connected to the positioning block 112 or connected to the external wall 116 of the lens barrel 110. Such a connection can, e.g., be mechanical or integral in nature. In the present embodiment, the protrusion portion 113 extends transversely (e.g., essentially orthogonal) from the external surface 1123 of the positioning block 112. The protrusion portion 113 facilitates the snatching of the lens barrel 110 during the assembling process. Also, during the process of insertion of the lens barrel 110 into the barrel base 120, the protrusion portion 113 can prevent the lens barrel 110 from dropping to the bottom of the barrel base 120 (i.e., act as a stop member). Thereby, unwanted damage of related optical elements, such as a sensor fixed on the bottom of the barrel base 120, is avoided.

The receiving housing 121 may be located in the center of the barrel base 120. An internal diameter of the receiving housing 121 is essentially equal to or slightly larger/less (e.g., a dimension tolerance between the internal diameter of the receiving housing 121 and the external diameter of lens barrel 110 is in a range from ±30 micrometers to ±50 micrometers) than an external diameter of the lens barrel 110. The respective diameters are chosen in this manner so that the lens barrel 110 can be slidably received in the receiving housing 121 in a matter that facilitates slide movement therebetween yet maintains an accurate and precise alignment between such elements. The receiving housing 121 has an internal wall 126. At least one positioning slot 122, corresponding to the positioning block 112 of the lens barrel 110, is defined in the internal wall 126 and is parallel to the longitudinal axis of the receiving housing 121. In the present embodiment, the receiving housing 121 includes one positioning slot 122, corresponding to the positioning block 112.

The positioning slot 122 has a similar structure and similar dimensions to the positioning block 112, so as to promote a female/male slide fit of the positioning block 112 in the positioning slot 122. In detail, the positioning slot 122 is created in the internal wall 126 of the receiving housing 121 along a direction parallel to an axis of the receiving housing 121. A first sliding protrusion 124a and a second sliding protrusion 124b, opposite to the first sliding protrusion 124a, are formed on a pair of side surfaces of the positioning slot 122 and extend parallel to the longitudinal axis of the receiving housing 121. The first sliding protrusion 124a corresponds to the first sliding groove 114a. Similarly, the second sliding protrusion 124b corresponds to the second sliding groove 114b. Thus, the first sliding protrusion 124a and the second sliding protrusion 124b, respectively, cooperate with the first sliding groove 114a and the second sliding groove 114b to slidably fix the lens barrel 110 within the receiving housing 121 and, by extension, to the barrel base 120.

An assembling process of the optical lens module 10 is provided in the following. Firstly, the barrel base 120 with the receiving housing 121 is provided. Secondly, the positioning block 112 of the lens barrel 110 is aimed/directed at/into the positioning slot 122, and, then, the first sliding groove 114a and the second sliding groove 114b, respectively, slide along the first sliding protrusion 124a and the second sliding protrusion 124b. As a result, the lens barrel 110 is inserted into the receiving housing 121. Once the lens barrel 110 slides into the lens barrel 110 to a certain depth, the lens barrel 110 is fastened in the receiving housing 121, employing a gluing/adhering method and/or a mechanical fixing method. In the gluing/adhering method, a curing adhesive, e.g., an UV light-curing adhesive, may, advantageously, be preformed on the internal wall 126 of the barrel base 120. As the lens barrel 110 slides into the receiving housing 121 to the required depth, the curing adhesive is solidified (e.g., via UV exposure). Thus, the external wall 116 of the lens barrel 110 and the internal wall 126 of the barrel base 120 are glued/adhered together, thereby fixing the lens barrel 110 to the barrel base 120, via the receiving housing 121.

Figure 2:
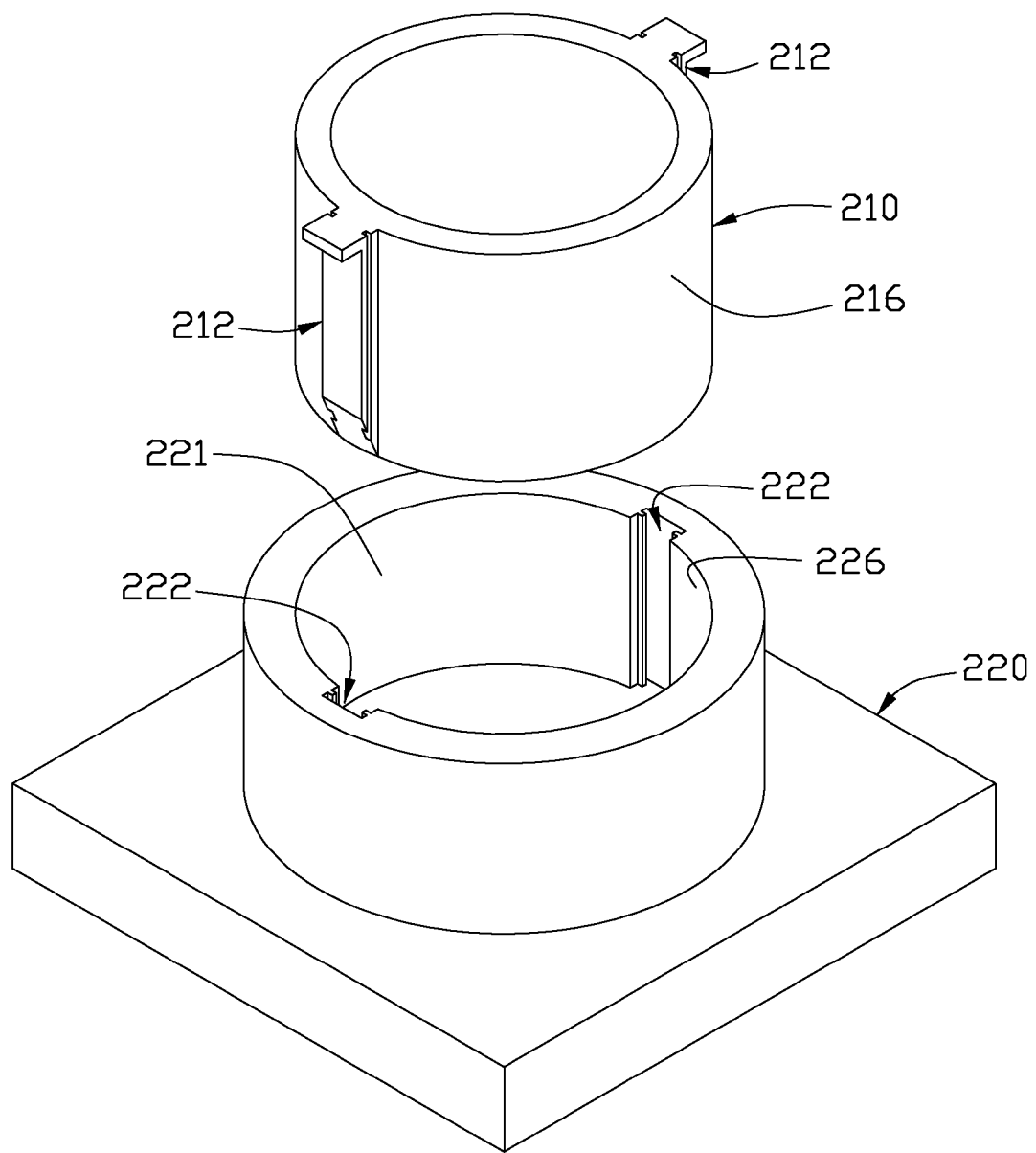
FIG. 2 is an isometric view of optical lens module, in accordance with a second embodiment.

Referring to FIG. 2, an optical lens module 20, in accordance with a second embodiment, is shown. The optical lens module 20 is similar to the optical lens module 10 of the first embodiment, except the optical lens module 20 has two positioning blocks 212 and two corresponding positioning slots 222. The two positioning blocks 212 are symmetrically located on an external wall 216 along an axis of a lens barrel 210. Correspondingly, the two positioning slots 222 are symmetrically created in an internal wall 226 of a receiving housing 221 of a barrel base 220. The two positioning blocks 212 are similar in structure with the positioning block 112 of the first embodiment. In this embodiment, the two positioning blocks 212 and two corresponding positioning slots 222 cooperate to further facilitate the lens barrel 210 being inserted into the receiving housing 221 of the barrel base 220.

Figure 3:
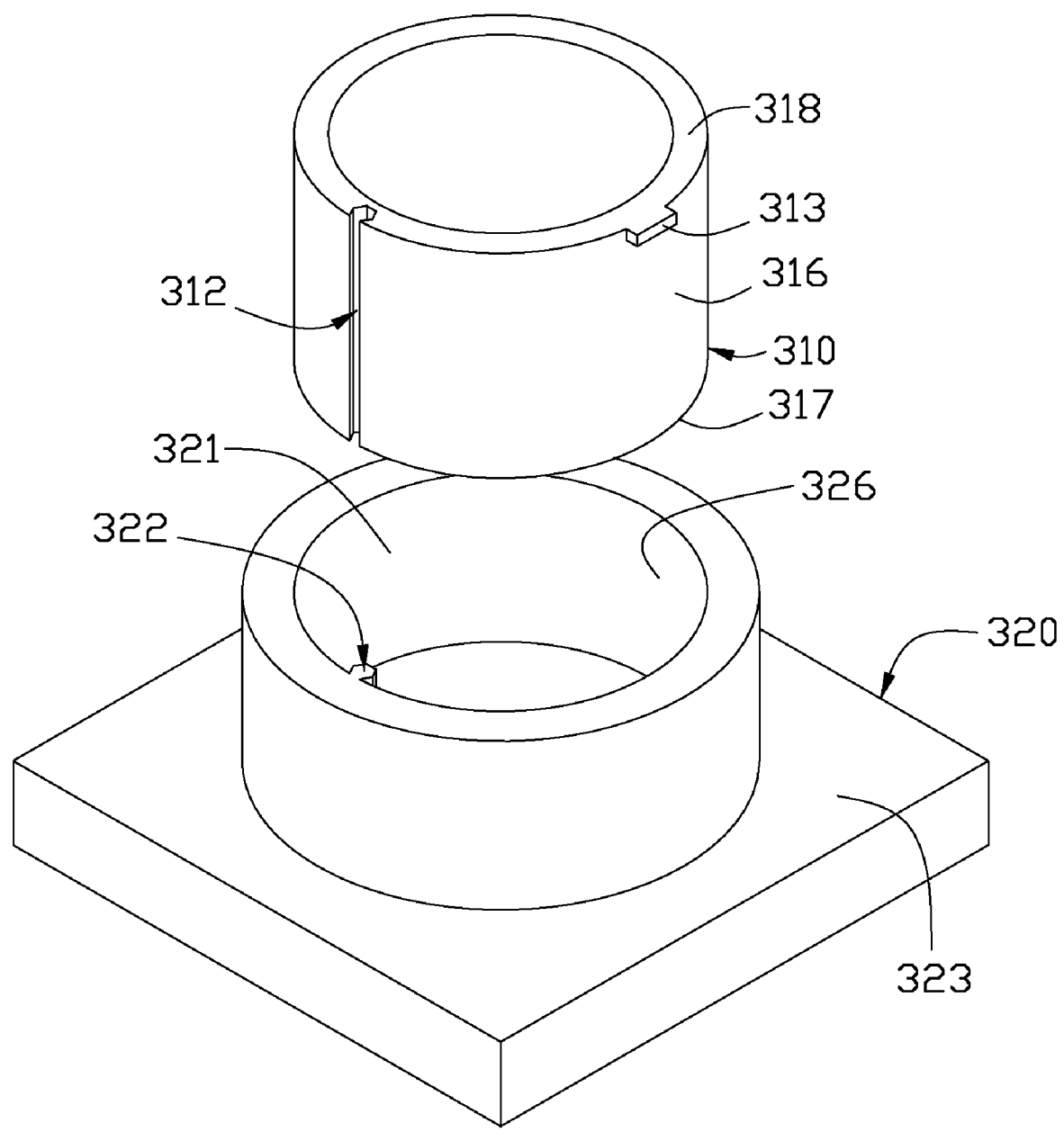
FIG. 3 is an isometric view of optical lens module, in accordance with a third embodiment.

Referring to FIG. 3, an optical lens module 30, in accordance with a third embodiment, is shown. The optical lens module 30 includes a lens barrel 310 and a barrel base 320. The lens barrel 310 includes a first end surface 317 and an opposite second end surface 318. The barrel base 320 includes a receiving housing 321 extending essentially orthogonally from the main portion 323 thereof. At least a positioning slot 312 is created in an external wall 316, along an axis (i.e., longitudinal/optical axis) of the lens barrel 310. At least a positioning block 322 corresponding to the positioning slot 312 is arranged on an internal wall 326 of the receiving housing 321. The positioning block 322 may, for example, be a prism, e.g., a hexagonal prism. Correspondingly, a cross section profile of the positioning slot 312 should match that of the positioning block 322, for example, a mating polygon, e.g., a hexagon.

A protrusion portion 313 may extend transversely/radially from any position of a second end surface 318 of the lens barrel 310. In the present embodiment, the protrusion portion 313 is located at any position except the position where the positioning slot 312 intersects the second end surface 318.

Figure 4:
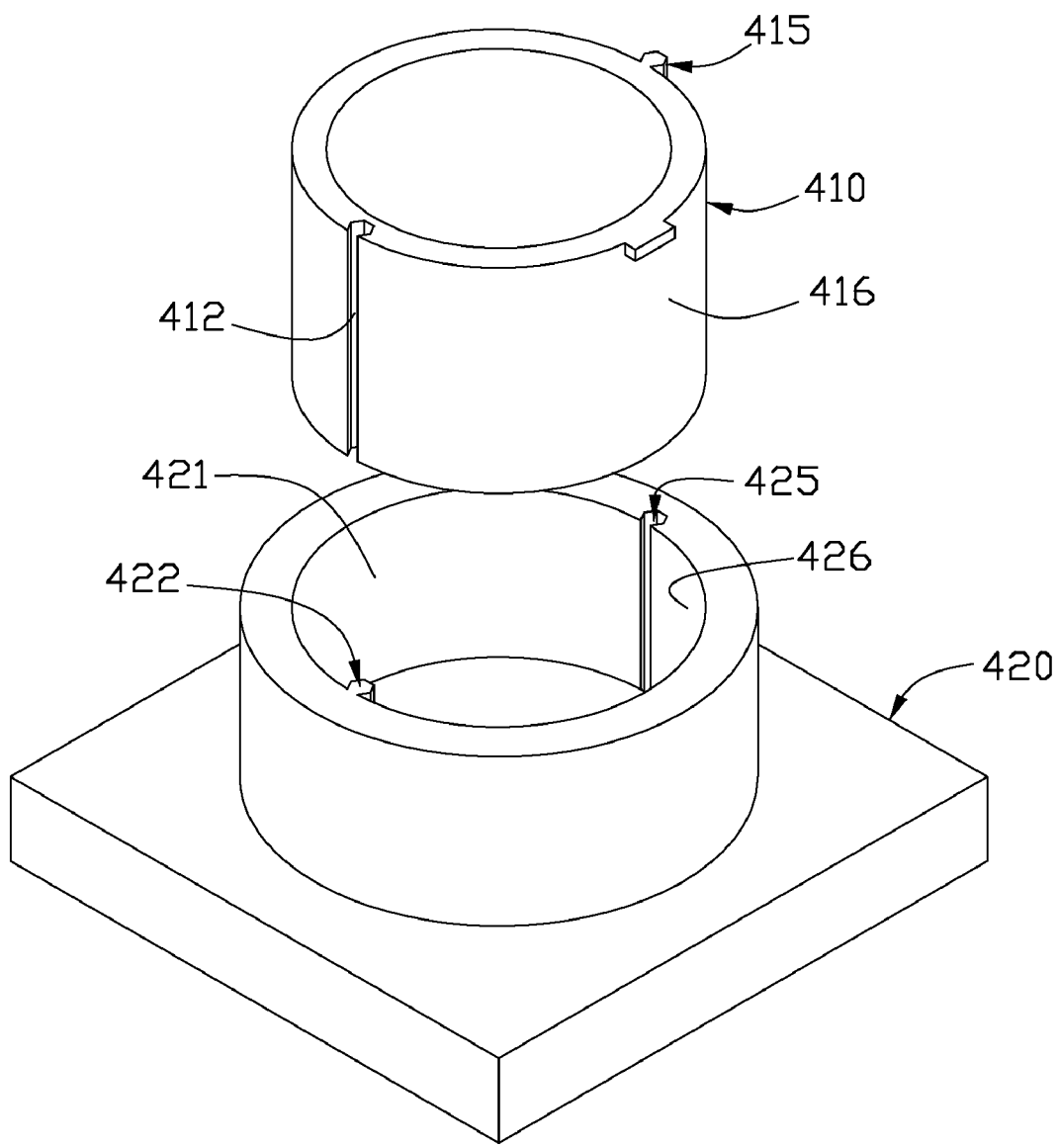
FIG. 4 is an isometric view of optical lens module, in accordance with a fourth embodiment.

Referring to FIG. 4, an optical lens module 40, in accordance with a fourth embodiment, is shown. The optical lens module 40 includes a lens barrel 410 and a barrel base 420, with the barrel base 420 further defining a receiving housing 421. The lens barrel 410 includes a first positioning slot 412 and a second positioning block 415. The first positioning slot 412 and the second positioning block 415 are located on an external wall 416 of the lens barrel 410, along a longitudinal/optical axis direction of the lens barrel 410. The barrel base 420 includes a first positioning block 422, corresponding to the first positioning slot 412, and a second positioning slot 425, corresponding to the second positioning block 415. The first positioning block 422 and the second positioning slot 425 are located on an internal wall 426 of the receiving housing 421. The first positioning slot 412 and the first positioning block 422, as well as the second positioning block 415 and the second positioning slot 425, cooperate to facilitate the insertion of the lens barrel 410 into the receiving housing 421.

Regarding the aforementioned optical lens modules, firstly, the positioning block and the positioning slot cooperate to facilitate the insertion of the lens barrel into the receiving housing. Due to such a relationship, an assembling efficiency and assembling precision can be increased. Compared with the conventional screw thread connection structure, the structure of the present optical lens module can be greatly simplified. Secondly, the positioning block and the positioning slot, respectively, include the cooperative structures, such as the sliding protrusion and the sliding groove, that facilitate simple and accurate mounting of the lens barrel within the receiving housing. The sliding protrusion combined with the sliding groove can fix the lens barrel in a radial direction, i.e., perpendicular to the axis of the lens barrel, and, thereby, prevent relative rotation between the lens barrel and the receiving housing.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical lens module comprising: a lens barrel comprising an external wall; and a barrel base having a receiving housing, the receiving housing being configured for receiving the lens barrel therein, the receiving housing defining an internal wall therein; wherein the lens barrel defines at least a first positioning block or at least a second positioning slot at the external wall parallel to a longitudinal axis of the lens barrel, the receiving housing defines at least a first positioning slot corresponding to the first positioning block or at least a second positioning block corresponding to the second positioning slot at the internal wall of the receiving housing, the lens barrel comprises a first end surface and a second end surface at opposite ends thereof, the first positioning block or the second positioning slot communicating with the first end surface and the second end surface, and the first positioning block or the second positioning block is a prism and a cross sectional profile of the first positioning slot or the second positioning slot is a polygon, the prism and the polygon matching in shape in order to thereby facilitate a slide fit of the first positioning block in the first positioning slot or of the second positioning block in the second positioning slot of the receiving housing for respectively cooperating to mount the lens barrel in the receiving housing.

2. An optical lens module comprising: a lens barrel comprising an external wall: and a barrel base having a receiving housing, the receiving housing being configured for receiving the lens barrel therein, the receiving housing defining an internal wall therein: wherein the lens barrel defines at least a first positioning block or at least a second positioning slot at the external wall parallel to a longitudinal axis of the lens barrel, the receiving housing defines at least a first positioning slot corresponding to the first positioning block or at least a second positioning block corresponding to the second positioning slot at the internal wall of the receiving housing. the first positioning block or the second positioning block is a prism and a cross sectional profile of the first positioning slot or the second positioning slot is a polygon, the prism and the polygon matching in shape in order to thereby facilitate a slide fit; the lens barrel comprises a first end surface and a second end surface at opposite ends thereof, the first positioning block or the second positioning slot communicating with the first end surface and the second end surface, the first positioning block or the second positioning block comprises a first side surface and a second side surface at opposite sides thereof, a bottom surface, a top surface, and an external surface, the external surface perpendicularly intersects the first side surface, the second side surface, and the top surface, the first side surface defines at least a first sliding groove along a lengthwise direction of the first positioning block or the second positioning block, the second side surface defines at least a second sliding groove along a lengthwise direction of the first positioning block or the second positioning block. and the first positioning slot or the second positioning slot defines at least a first sliding protrusion corresponding to the first sliding groove and at least a second sliding protrusion corresponding to the second sliding groove.

3. The optical lens module as claimed in claim 2, wherein the first sliding groove and the second sliding groove each communicate with the top surface and the bottom surface.

4. The optical lens module as claimed in claim 2, wherein the lens barrel further comprises a protrusion portion formed on the second end surface of the lens barrel.

5. The optical lens module as claimed in claim 4, wherein the protrusion portion extends transversely from the first positioning block.

6. The optical lens module as claimed in claim 1, wherein the first positioning block is engaged with the external wall of the lens barrel by mechanical connection means.

7. The optical lens module as claimed in claim 1, wherein the first positioning block is integrally formed with the lens barrel.

8. An optical lens module comprising:
a lens barrel comprising an external wall; and
a barrel base having a receiving housing, the receiving housing being configured for receiving the lens barrel therein, the receiving housing comprising an internal wall;
wherein at least a first positioning block is defined on the external wall along a longitudinal axis of the lens barrel, at least a first positioning slot corresponding to the first positioning block is defined in the internal wall of the receiving housing, and the first positioning block is a prism and a cross sectional profile of the first positioning slot is a polygon, the prism and the polygon matching in shape in order to thereby facilitate a slide fit of the first positioning block in the first positioning slot.

9. The optical lens module as claimed in claim 8, wherein the lens barrel further defines a second positioning slot and the receiving housing further defines a second positioning block corresponding to the second positioning slot.

10. The optical lens module as claimed in claim 8, wherein the lens barrel comprises a first end surface and a second end surface at opposite ends thereof, the first positioning block communicating with the first end surface and the second end surface.

11. The optical lens module as claimed in claim 1, wherein the lens barrel further comprises a protrusion portion formed on the second end surface.

12. The optical lens module as claimed in claim 2, wherein the external surface intersects the bottom surface at an obtuse angle.

13. The optical lens module as claimed in claim 2, wherein the first positioning block is engaged with the external wall of the lens barrel by mechanical connection means.

14. The optical lens module as claimed in claim 2, wherein the first positioning block is integrally formed with the lens barrel.

15. The optical lens module as claimed in claim 8, wherein the first positioning block is engaged with the external wall of the lens barrel by mechanical connection means.

16. The optical lens module as claimed in claim 8, wherein the first positioning block is integrally formed with the lens barrel.

17. The optical lens module as claimed in claim 10, wherein the lens barrel further comprises a protrusion portion formed on the second end surface.

* * * * *